United States Patent
Scholl et al.

(10) Patent No.: US 6,251,976 B1
(45) Date of Patent: Jun. 26, 2001

(54) RUBBER MIXTURES CONTAINING TRIMETHYLOPROPANE DISTILLATION RESIDUES

(75) Inventors: Thomas Scholl, Bergisch Gladbach; Herman-Josef Weidenhaupt, Pulheim; Achim Noack, Leichlingen; Lothar Steger, München, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/280,155

(22) Filed: Mar. 26, 1999

(30) Foreign Application Priority Data

Apr. 1, 1998 (DE) ............................................. 198 14 655

(51) Int. Cl.⁷ ........................................................ C08J 5/06
(52) U.S. Cl. ............................ 524/386; 524/387; 524/388
(58) Field of Search .................................... 524/386, 387, 524/388

(56) References Cited

U.S. PATENT DOCUMENTS

| 3,923,719 | 12/1975 | Gattuso | 260/30.8 R |
|---|---|---|---|
| 3,962,347 * | 6/1976 | Herz | 260/615 R |
| 5,663,226 | 9/1997 | Scholl et al. | 524/262 |
| 5,703,151 | 12/1997 | Yamamoto | 524/262 |
| 5,717,022 | 2/1998 | Beckmann et al. | 524/493 |

FOREIGN PATENT DOCUMENTS

| 1077865 | 3/1960 | (DE) . |
|---|---|---|
| 4435311 | 4/1996 | (DE) . |

OTHER PUBLICATIONS

Database WPI, Sec. Ch, Wk. 8118, Derwent. Pub. Ltd., London, GB, Class A12, AN 81–32067D XP002108193 & SU 757 561 B (Kirov Poly) Aug. 23, 1980.

* cited by examiner

Primary Examiner—Peter D. Mulcahy
(74) Attorney, Agent, or Firm—Joseph C. Gil; Noland J. Cheung

(57) ABSTRACT

The present invention relates to rubber mixtures consisting of at least one rubber and a specific proportion of a distillation residue from industrial trimethylolpropane production and the use of the rubber mixtures for the production of vulcanisates, especially for the production of highly reinforced, abrasion-resistant mouldings, particularly preferably for the production of tyres exhibiting low rolling resistance and high abrasion resistance.

8 Claims, No Drawings

RUBBER MIXTURES CONTAINING TRIMETHYLOPROPANE DISTILLATION RESIDUES

FIELD OF THE INVENTION

The present invention relates to rubber mixtures consisting of at least one rubber and a specific proportion of a distillation residue from industrial trimethylolpropane production, and to the use of the rubber mixtures for the production of vulcanisates, especially for the production of highly reinforced, abrasion-resistant mouldings, particularly preferably for the production of tyres exhibiting low rolling resistance and high abrasion resistance.

BACKGROUND OF THE INVENTION

To produce tyres with reduced rolling resistance, a number of proposed solutions have been worked out. In DE-A 2 255 577 and 4 435 311, EP-A 670 347 and U.S. Pat. No. 4,709,065, specific polysulfidic silanes have been described as reinforcing fillers for silica-containing rubber vulcanisates. A disadvantage of the use of the polysulfidic silanes described there as reinforcing fillers for silica-containing rubber vulcanisates, however, is that relatively large quantities of the expensive polysulfidic silanes are needed to achieve acceptable processing properties.

To improve the processing properties of silica-containing rubber mixtures, other additives such as fatty acid esters, fatty acid salts or mineral oils have been proposed. However, these additives have the disadvantage of increasing flowability but, at the same time, reducing the moduli at greater elongation (e.g. 100 to 300%), so that the reinforcing effect of the filler is reduced.

In addition, it was known to add polyalcohols and polyglycols to rubber mixtures to improve their processing properties (cf. EP-A 761 734 and EP-A 738 755). Compared with the distillation residues from industrial trimethylolpropane production according to the invention, however, polyalcohols and polyglycols are expensive and inadequate in terms of improving flowability and scorch time.

SUMMARY OF THE INVENTION

The object of the present invention was therefore to find less expensive additives which greatly increase the flowability of rubber mixtures and increase the scorch time without exhibiting the disadvantages of the additives used up to the present, as described above.

DETAILED DESCRIPTION OF THE INVENTION

The present invention therefore provides rubber mixtures consisting of at least one rubber and 0.1 to 15 parts by weight, based on 100 parts by weight of the total quantity of rubbers used, of a distillation residue from industrial trimethylolpropane production, the distillation residue having a viscosity of 0.5 to 20 Pa.sec at 100° C.

A quantity of 0.3 to 10 parts by weight of a trimethylolpropane distillation residue is preferably added to the rubber mixtures according to the invention, particularly preferably 0.5 to 5 parts by weight, based on 100 parts by weight of the total quantity of rubbers used.

The viscosity of the distillation residue from industrial trimethylolpropane production is preferably 0.5 to 10 Pa.sec at 100° C.

Trimethylolpropane (2-ethyl-2-(hydroxymethyl)-1,3-propanediol) is obtained industrially by aldol condensation and reduction of n-butyraldehyde with formaldehyde, in yields of approx. 90%. Milk of lime, alkali or basic ion exchangers are generally used as catalysts for aldol condensation. Excess formaldehyde and bases, such as e.g). sodium hydroxide solution, reduce the aldol formed to trimethylolpropane. The reaction mixture is worked up by extraction with solvents such as amyl alcohol, cyclohexanol or acetic ester and subsequent distillation of the trimethylolpropane. In connection with this, we refer to Ullmann, Verlag Chemie, Weinheim 1976 (4) 7, page 231 and to the literature cited there. The residue remaining after distillation of the trimethylolpropane has the viscosity stated above and generally contains less than 10 wt. %, preferably less than 5 wt. % trimethylolpropane.

The rubbers to be used for the production of the rubber mixtures according to the invention include natural rubber and synthetic rubbers. Preferred synthetic rubbers are described, for example, in W. Hofmann, Kautschuktechnologie, Genter Verlag, Stuttgart 1980. They include BR—polybutadiene ABR—butadiene/ $C_1$–$C_4$ alkyl acrylate copolymers CR—polychloroprene IR—polyisoprene SBR—styrene/butadiene copolymers with styrene contents of 1–60, preferably 20–50 wt. %.

IIR—isobutylene/isoprene copolymers

NBR—butadiene/acrylonitrile copolymers with acrylonitrile contents of 5–60, preferably 10–40 wt. %

HNBR—partially hydrated or fully hydrated NBR rubber

EPDM—ethylene/propylene/diene copolymers and mixtures of these rubbers.

For the production of vehicle tyres, mixtures of natural rubber, emulsion SBR and solution SBR and polybutadiene rubber are especially important. The use of solution SBR rubbers with a vinyl content of 20–60 wt. % and of polybutadiene rubbers with a high 1,4-cis content (>90%) produced with catalysts based on nickel, cobalt, titanium and/or neodymium, and polybutadiene rubber with a vinyl content of up to 75% and mixtures of these solution SBR and polybutadiene rubbers is of particular interest for use in the rubber mixtures according to the invention.

The rubber mixtures according to the invention may contain 0.1 to 300 parts by weight of many different fillers, based on 100 parts by weight of the total quantity of rubber. Oxide or silicate fillers, carbon blacks or rubber gels are particularly suitable as fillers. Oxide or silicate fillers are preferred.

The following are particularly preferred:

fine-particle silica, produced e.g. by precipitation of solutions of silicates or flame hydrolysis of silicates, from silicon halides with specific surfaces of 5–1000, preferably 20–400 $m^2/g$ (BET surface) and with a primary particle size of 10–400 nm. The silicas may optionally also be present as mixed oxides with other metal oxides, such as Al, Mg, Ca, Ba, Zn, Zr, Ti oxides.

synthetic silicates, such as aluminium silicate, alkaline earth silicates, such as magnesium silicate or calcium silicate, with BET surfaces of 20–400 $m^2/g$ and primary particle diameters of 10–400 nm.

natural silicates, such as kaolin and other naturally occurring silicas glass fibres and glass-fibre products (mats, strands) or microglass beads metal oxides, such as zinc oxide, calcium oxide, magnesium oxide, aluminium oxide metal carbonates, such as magnesium carbonate, calcium carbonate, zinc carbonate metal hydroxides, such as aluminium hydroxide, magnesium hydroxide.

The fillers mentioned are preferably used in quantities of 5 to 200 parts by weight, especially in quantities of 10 to 150 parts by weight, based on 100 parts by weight of rubbers used.

As mentioned, carbon blacks are also suitable as fillers. They are produced by the lamp black, furnace or gas black process and have BET surfaces of 20 to 200 m$^2$/g, such as e.g. SAF, ISAF, HAF, FEF or GPF blacks.

In addition, rubber gels may also be added as fillers to the rubber mixtures according to the invention. These rubber gels are based on polybutadiene, polychloroprene, NBR or SBR rubbers.

In a particularly preferred embodiment the rubber mixtures according to the invention consist of 0.5–10 parts by weight distillation residue from industrial trimethylolpropane production, 10 to 100 parts by weight of oxide or silicate filler and 5 to 50 parts by weight of carbon black and/or rubber gels, each based on 100 parts by weight of rubbers used, in addition to at least one rubber.

To produce rubber vulcanisates, the known, conventional rubber auxiliaries may be added to the rubber mixtures according to the invention, especially vulcanisation accelerators, antioxidants, heat stabilisers, light stabilisers, ozone stabilisers, processing aids, plasticisers, tackifiers, blowing agents, dyes, pigments, waxes, extenders, organic acids, inhibitors, metal oxides, crosslinking agents and activators. In connection with this, we refer to I. Franta, Elastomers and Rubber Compounding Materials, Elsevier 1989.

The rubber auxiliaries are used in conventional quantities which depend, among other things, on the application. Conventional quantities are, e.g., quantities of 0.1–50 wt. %, based on the total quantity of rubbers used.

In addition, the known crosslinking agents, such as sulfur, sulfur donors or peroxides may also be used in the production of rubber vulcanisates. Naturally, vulcanisation accelerators such as mercaptobenzothiazoles, guanidines, thiurams, dithiocarbamates, thioureas and/or thiocarbonates may also be added to the rubber mixtures according to the invention. The vulcanisation accelerators and crosslinking agents are used in quantities of approx. 0.1–10 wt. %, preferably 0.1–5 wt. %, based on the total quantity of rubbers used.

In a particularly preferred embodiment, the rubber mixtures according to the invention receive, in addition to the rubbers mentioned, the fillers, the distillation residue from industrial trimethylolpropane production, the rubber auxiliaries and cross-linking agents, a further 0.2 to 4 parts by weight of zinc salts of aliphatic, cycloaliphatic and/or aromatic $C_6$–$C_{36}$ carboxylic acids, e.g. zinc salts of tallow fatty acid, oleic acid or benzoic acid. In addition, in the particularly preferred embodiment, a further 0.5 to 15 parts by weight, based on 100 parts by weight of rubbers used, of sulfur-containing silyl ethers are added as filler activators, especially bis(trialkoxysilylalkyl) polysulfides, as described in DE-A 2 141 159 and DE-A 2 255 577, oligomeric and/or polymeric, sulfur-containing silyl ethers as described in DE-A 4 425 311 and EP-A 670 347 and mercaptoalkyltrialkoxysilanes, mercaptopropyltriethoxysilane and/or thiocyanatoalkylsilyl ether as described in DE-A 19.544.469.

The rubber mixtures according to the invention may be produced in the conventional apparatus, such as mixers, especially rollers, internal mixers and compounding extruders.

The vulcanisation of the rubber mixtures according to the invention may take place at temperatures of 100 to 200° C., preferably 130 to 180° C., optionally under pressures of 10 to 200 bar.

The rubber mixtures containing trimethylolpropane distillation residues according to the invention are distinguished by particularly good flowability, high processing safety and improved vulcanisation kinetics and provide vulcanisates with higher moduli. They are therefore especially suitable for the economical production of highly reinforced, abrasion-resistant mouldings.

The following are especially mentioned as mouldings: cable sheathings, hoses, drive belts, conveyor belts, roller coverings, tyres, shoe soles, packing rings and damping elements. The use of the rubber mixtures according to the invention for the production of tyre treads with low rolling resistance is especially preferred.

EXAMPLES

Example 1

Distillation Residue from Industrial Trimethylolpropane Production

Viscosity: 2 Pa.sec at 100° C. Free trimethylolpropane content 3–5 wt. %, ash residue at 1000° C.: 4.7%. Elemental analysis: carbon: 53.2%, hydrogen: 10.1%, oxygen: 32.5%. Density at 120° C.: 1.203.

Example 2

Rubber Mixtures and Vulcanisates

The following rubber mixtures were prepared in a 1.5 l kneader at an internal temperature of 130–140° C. and sulfur and accelerators were then mixed in on a roller at approx. 50–80° C. The quantities stated refer to parts by weight.

|  | Comparison 2A | Comparison 2B | Comparison 2C | Example 2D |
|---|---|---|---|---|
| L-SBR Buna VSL 5025-1 (Bayer) | 96 | 96 | 96 | 96 |
| BR Buna CB 24 (Bayer) | 30 | 30 | 30 | 30 |
| Vulkasil S silica (Bayer AG) | 80 | 80 | 80 | 80 |
| Corax N 339 carbon black (Degussa) | 6.5 | 6.5 | 6.5 | 6.5 |
| Silane S 69 (Degussa) | 6.5 | 6.5 | 6.5 | 6.5 |
| Stearic acid | 1 | 1 | 1 | 1 |
| Zinc oxide RS (Bayer) | 2.5 | 2.5 | 2.5 | 2.5 |
| aromat. mineral oil | 8 | 8 | 8 | 8 |
| Vulkanox HS antioxidant (Bayer) | 1 | 1 | 1 | 1 |
| Vulkanox HS antioxidant (Bayer) | 1 | 1 | 1 | 1 |
| Antilus 54 wax (Rheinchemie) | 1.5 | 1.5 | 1.5 | 1.5 |
| Diethylene glycol | 0 | 4 | 0 | 0 |
| Trimethylolpropane | 0 | 0 | 4 | 0 |
| Substance acc. to Example 1 | 0 | 0 | 0 | 4 |
| Sulfur | 1.5 | 1.5 | 1.5 | 1.5 |

-continued

|  | Comparison 2A | Comparison 2B | Comparison 2C | Example 2D |
|---|---|---|---|---|
| Vulcacit D accelerator (Bayer) | 2 | 2 | 2 | 2 |
| Vulcacit CZ accelerator (Bayer) | 1.5 | 1.5 | 1.5 | 1.5 |
| Mixing viscosity ML 1 + 4 at 100 ° C. (ME) | 76 | 73 | 69 | 67 |
| Mooney Scorch at 130 ° C. (minutes) | 11 | 11 | 15 | 18 |
| Vulcanisation at 160 ° C. (minutes) | 30 | 30 | 30 | 30 |
| Modulus at 100% elongation (MPa) | 2.9 | 3.5 | 3.3 | 3.4 |
| Modulus at 300% elongation (MPa) | 12.5 | 14.6 | 13.6 | 14.1 |
| Hardness at 23 ° C. (Shore A) | 71 | 74 | 76 | 75 |
| Tensile strength (MPa) | 20.1 | 17.8 | 18.8 | 18 |
| Rebound resilience at 23 ° C. (%) | 28 | 27 | 28 | 28 |
| Rebound resilience at 70 ° C. (%) | 51 | 48 | 53 | 52 |
| Abrasion DIN 53 516 (ccm) | 78 | 80 | 76 | 78 |

These results show the excellent effectiveness of the distillation residue from industrial trimethylolpropane production in terms of reducing the mixing viscosity (measured as ML 1+4) and extending the processability (measured as Mooney scorch time) of the rubber mixture while at the same time giving a high level of mechanical properties of the vulcanisates. The raw material costs are reduced effectively.

What is claimed is:

1. Rubber mixtures comprising at least one rubber and 0.1 to 15 parts by weight, based on 100 parts by weight of rubbers used, of a distillation residue obtained in the production of industrial trimethylolpropane from aldol condensation and reduction of n-butyraldehyde with formaldehyde, the distillation residue having a viscosity of 0.5 to 20 Pa.sec at 100° C.

2. Rubber mixtures according to claim 1, characterised in that they contain 0.1 to 300 parts by weight of inorganic or organic fillers, based on 100 parts by weight of rubbers used.

3. Rubber mixtures according to claim 1, characterised in that oxide or silicate fillers, carbon blacks and/or rubber gels are used as fillers.

4. Rubber mixtures according to claim 1, characterised in that at least one precipitated silica or precipitated silicates with a specific surface of 20 to 400 $m^2/g$ are used as fillers.

5. Rubber mixtures according to claim 1, characterised in that they contain 0.5 to 10 parts by weight of distillation residue from industrial trimethylolpropane production, 10 to 100 parts by weight of oxide or silicate filler and 2 to 50 parts by weight of carbon black or rubber gel, based on 100 parts by weight of rubbers used in each case, in addition to at least one rubber.

6. A vulcanizate comprising at least one rubber mixture consisting of at least one rubber and 0.1 to 15 parts by weight, based on 100 parts by weight of rubbers used, of a distillation residue obtained in the production of industrial trimethylolpropane from aldol condensation and reduction of n-butyraldehyde with formaldehyde, said distillation residue having a viscosity of 0.5 to 20 Pa.sec at 100° C.

7. A tire comprising at least one rubber mixture consisting of at least one rubber and 0.1 to 15 parts by weight, based on 100 parts by weight of rubbers used, of a distillation residue obtained in the production of industrial trimethylolpropane from aldol condensation and reduction of n-butyraldehyde with formaldehyde, said distillation residue having a viscosity of 0.5 to 20 Pa.sec at 100° C.

8. A tire according to claim 7, wherein said tire's tire tread comprises at least one rubber mixture consisting of at least one rubber and 0.1 to 15 parts by weight, based on 100 parts by weight of rubbers used of a distillation residue obtained in the production of industrial trimethylolpropane from aldol condensation and reduction of n-butyraldehyde with formaldehyde, said distillation residue having a viscosity of 0.5 to 20 Pa.sec at 100° C.

* * * * *